(12) United States Patent
Vong et al.

(10) Patent No.: US 6,374,276 B2
(45) Date of Patent: Apr. 16, 2002

(54) HANDHELD COMPUTING DEVICE WITH EXTERNAL NOTIFICATION SYSTEM

(75) Inventors: William Vong, Seattle; Chad Schwitters, Redmond, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/767,529

(22) Filed: Jan. 22, 2001

Related U.S. Application Data

(62) Division of application No. 08/854,102, filed on May 8, 1997, now Pat. No. 6,209,011.

(51) Int. Cl.[7] ............................................. G04B 19/00
(52) U.S. Cl. .................. 708/112; 708/135; 710/260; 713/321
(58) Field of Search .................. 708/112, 135; 710/48.51, 260–266; 713/300–324; 324/309–571

(56) References Cited

U.S. PATENT DOCUMENTS

| | | | |
|---|---|---|---|
| 3,999,050 A | 12/1976 | Pitroda | 708/112 |
| 4,162,610 A | 7/1979 | Levine | 368/41 |
| 4,258,354 A | 3/1981 | Carmon et al. | 340/309.4 |
| 4,768,176 A | 8/1988 | Kehr et al. | 368/10 |
| 4,774,697 A | 9/1988 | Aihara | 368/41 |
| 4,780,839 A | 10/1988 | Hirayama | 708/160 |
| 4,891,776 A | 1/1990 | Kuroki et al. | 708/111 |
| 5,050,138 A | 9/1991 | Yamada et al. | 368/10 |
| 5,157,640 A | 10/1992 | Backner | 368/10 |
| 5,237,684 A | 8/1993 | Record et al. | 709/302 |
| 5,262,763 A | 11/1993 | Okuyama et al. | 345/87 |
| 5,416,725 A | 5/1995 | Pacheco et al. | 702/176 |
| 5,664,228 A | * 9/1997 | Mital | 710/62 |
| 5,754,629 A | 5/1998 | Kunimori et al. | 379/88.13 |
| 5,760,690 A | 6/1998 | French | 340/571 |
| 5,832,489 A | 11/1998 | Kucala | 707/10 |
| 5,900,875 A | 5/1999 | Haitani et al. | 345/349 |
| 5,973,612 A | * 10/1999 | Deo et al. | 340/825.44 |
| 6,009,338 A | 12/1999 | Iwata et al. | 455/575 |
| 6,047,260 A | 4/2000 | Levinson | 705/9 |
| 6,128,012 A | * 10/2000 | Seidensticker, Jr. et al. | 345/336 |

FOREIGN PATENT DOCUMENTS

EP 0698852 A2 2/1996

OTHER PUBLICATIONS

Franklin Day Planner Electronic Organizer, 2.2–2.5, 4.2–4.9, Copyright 1996 (most likely Feb.).

* cited by examiner

Primary Examiner—Christopher B. Shin
(74) Attorney, Agent, or Firm—Lee & Hayes, PLLC

(57) ABSTRACT

A portable handheld computing device has a notification system that alerts a user of an event regardless of whether the device is on or off. The notification system has a notification mechanism that is activated upon occurrence of the event and remains active until the user acknowledges the activated mechanism. In one implementation, the notification mechanism is a light emitting diode (LED) mounted externally on the handheld computing device. The LED is visible to the user when the lid is closed onto the base (i.e., the device is off) or when the lid is open (i.e., the device is on). The notification mechanism also has a deactivation button mounted externally of the handheld computing device. The user depresses the deactivation button to deactivate the LED. The LED and deactivation button may be integrated as a single component.

10 Claims, 6 Drawing Sheets

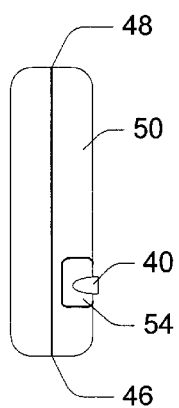
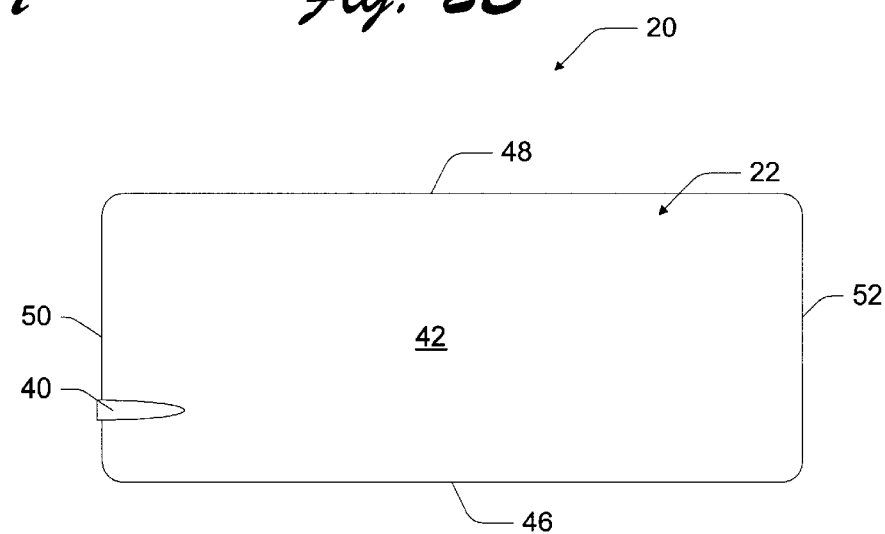
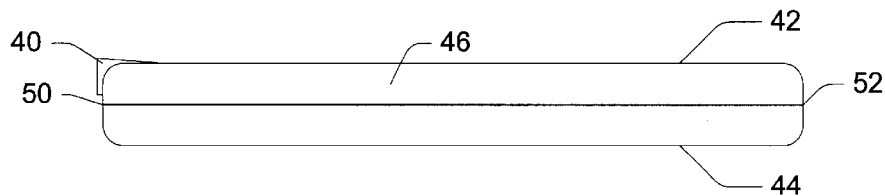

HANDHELD COMPUTING DEVICE WITH EXTERNAL NOTIFICATION SYSTEM

RELATED APPLICATIONS

This is a divisional of U.S. patent application Ser. No. 08/854,102, filed May 8, 1997, which is now U.S. Pat. No. 6,209,011.

TECHNICAL FIELD

This invention relates to portable handheld computing devices, such as handheld personal computers (H/PCs). More particularly, this invention relates to an external notification system for handheld computing devices.

BACKGROUND OF THE INVENTION

Small, handheld computing devices have been steadily growing in popularity in recent years. The devices go by different names, including palmtops, pocket computers, personal digital assistants, personal organizers, and the like. This disclosure is primarily directed to a class of computing devices referred to as handheld personal computers, or "H/PCs", although aspects of this invention can be implemented other types of handheld computing devices.

H/PCs are small, pocket-sized devices having an LCD (liquid crystal display) with a touch-sensitive screen, a stylus to enter data through the screen, and an input device such as a keypad or miniature QWERTY keyboard. H/PCs have a microprocessor, memory, and are capable of running an operating system and one or more applications on the operating system. Microsoft Corporation recently released the Windows® CE operating system for use on H/PCs, which is a scaled-down version of its popular Windows® operating systems manufactured for personal computers.

One of the most desirable characteristics of H/PCs is their portability. The compact, portable H/PCs provide a user with real computer-like applications—such as email, PIM (personal information management), Internet browser, spreadsheet, word processing. A traveling user can receive email messages, schedule meetings or appointments, and browse the Internet from the H/PC.

Some handheld computing devices can notify a user of a scheduled event, if they are turned on. The device plays an alarm sound, or pops-up a dialog box, to alert the user of the event. However, many handheld computing devices have no means of notifying a user when they are turned off, which is normally the case to conserve power. While some handheld computing devices might be configured to wake up and sound an alarm, such devices typically time out the alarm after a short period. As a result, the user can miss the alarm because it terminates before being noticed. In addition, audio alarms may, on occasions, be too faint for the surrounding environment (e.g., an alarm might be overpowered by noise in an airplane flight) or not sufficiently strong to command a user's attention when the user is not immediately next to the device.

It would be advantageous to develop a notification system for handheld computing devices, such as H/PCs, that notifies a user when an event occurs regardless of whether the device is on or off, open or closed, pocketed, or docked, and which remains active until the user acknowledges it. It would also be advantageous to develop a notification system that provides a lasting external notification to the user, rather than a short-run alarm or a pop-up box that is not externally visible.

SUMMARY OF THE INVENTION

This invention concerns a portable handheld computing device having a notification system that alerts a user of an event regardless of whether the device is on or off, open or closed, pocketed, or docked. The notification system has a notification mechanism that is activated upon occurrence of the event and remains active until the user acknowledges the activated mechanism.

According to an aspect of this invention, the notification mechanism is a light emitting diode (LED) that is (by user option) turned on by the notification system when an event occurs. The LED remains activated until the user takes action to handle the event.

According to another aspect of this invention, the LED is mounted externally on the handheld computing device. More particularly, the handheld device has a casing with a lid and a base. The LED is mounted on the lid's upper surface and wraps around to one of the end surfaces of the lid. In this manner, the LED is visible to the user when the lid is closed onto the base (i.e., the device is off) or when the lid is open (i.e., the device is on).

According to another aspect of this invention, the notification mechanism also has a deactivation button mounted externally of the handheld computing device. The user depresses the deactivation button to deactivate the LED (as well as any other external signals that may be used). In one implementation, the LED and deactivation button are integrated as a single component mounted on the device lid.

According to yet another aspect of this invention, a notification program runs on the handheld computing device and is callable by an application to help schedule events. The notification program sets timers with the system clock, which is always on even when the handheld computer is turned off. When a timer expires, the system clock sends an interrupt to the notification program to wake up the notification program so that it can turn on the LED. The LED is coupled to power so that it can remain on and the notification program can go back asleep. The LED continues emitting light until the user notices and presses the deactivation button.

According to another aspect, the notification program places a taskbar annunciator in the taskbar of an operating graphical user interface window when an event is realized. After depressing the deactivation button in recognition of the LED, the user can actuate the taskbar annunciator with a stylus or other means and jump directly to the source of the event. For instance, actuating the taskbar annunciator might open a window that describes an appointment, which is the root of the event.

According to another aspect, the notification program supports a graphical user interface that enables a user to set notification options specifying how external notification is to operate. For instance, the user might prefer a flashing light in combination with an alarm. The user can set these options through the user interface. The options are saved in a structure that is accessed when a user notification is set.

According to still another aspect, the notification program is called by the applications on the handheld computing device through an application program interface (API). The API defines a time parameter that specifies when the user notification should occur and a type parameter that references the structure containing the user-defined notification options.

BRIEF DESCRIPTION OF THE DRAWINGS

The same reference numbers are used throughout the drawings to reference like components and features.

FIG. 2A provides an end elevation view of the handheld computing device in a closed position.

FIG. 2B provides a front elevation view of the handheld computing device in a closed position.

FIG. 2C provides a side elevation view of the handheld computing device in a closed position.

DETAILED DESCRIPTION OF THE PREFERRED EMBODIMENT

Figure 1:
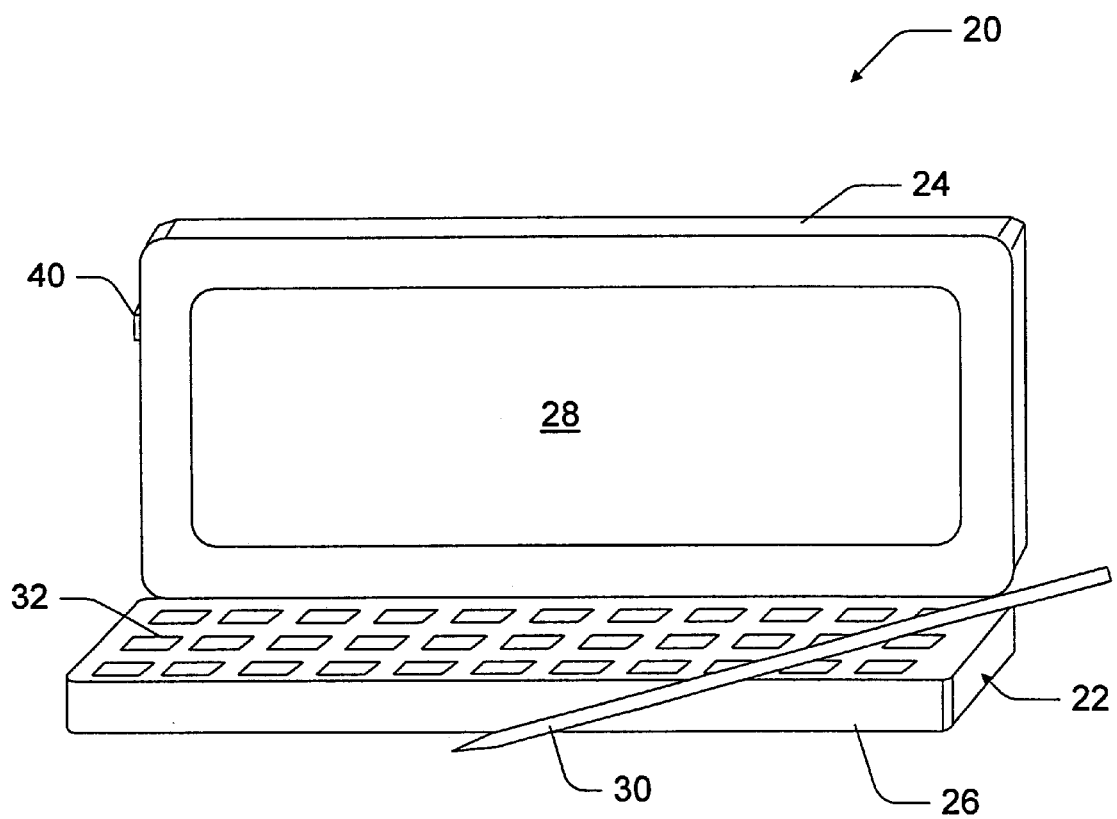
FIG. 1 is a perspective view of a handheld computing device in an open position.

FIGS. 1 and 2 show a handheld computing device 20. As used herein, "handheld computing device" means a small general computing device having a processing unit that is capable of running one or more application programs, a display, and an input mechanism that is typically something other than a full-size keyboard. The input mechanism might be a keypad, a touch-sensitive screen, a track ball, a touch-sensitive pad, a miniaturized QWERTY keyboard, or the like.

The handheld computing device 20 of FIGS. 1 and 2A–2C is embodied as a handheld personal computer (H/PC). The terms "handheld computing device" and "handheld personal computer" (or H/PC) are used interchangeably throughout this disclosure. However, in other implementations, the handheld computing device may be implemented as a personal digital assistant (PDA), a personal organizer, a palmtop computer, a computerized notepad, or the like.

Handheld computing device 20 has a casing 22 with a cover or lid 24 and a base 26. The lid 24 is hingedly connected to the base 26 to pivot between an open position (FIG. 1) and a closed position (FIGS. 2A–2C). The handheld computing device 20 has an LCD (liquid crystal display) 28 with a touch-sensitive screen mounted in lid 24. The device is equipped with a stylus 30 to enter data through the touchscreen display 28 and a miniature QWERTY keyboard 32, which are both mounted in base 26. The handheld computing device 20 can also be implemented with a wireless transceiver (not shown) such as an IR (infrared) transceiver and/or an RF (radio frequency) transceiver. Although the illustrated implementation shows a two-member H/PC 20 with a lid 24 and a base 26, other implementations of the H/PC might comprise an integrated body without hinged components, as is the case with computerized notepads (e.g., Newton® from Apple Computers).

In the above respects, the H/PC 20 is of conventional design and will not be described in detail. Many manufacturers make suitable H/PCs. However, unlike conventional H/PCs, the handheld computing device 20 of this invention is further implemented with an external notification system.

In general, the external notification system is designed to alert a user of an event regardless of whether the handheld computing device is presently on or off, or whether the device is presently running a program. The notification system has a notification mechanism that is activated upon occurrence of the event to alert the user. The notification mechanism remains active until the user acknowledges it, even if the handheld computing device is otherwise turned off. The notification mechanism is an external, sensory perceptible mechanism that attracts the user's attention when the device is on or off and regardless of whether the lid is open or closed. The notification mechanism can be implemented in a variety of ways, including a light, an audio generator, a vibration device, or other forms of sensory perceptible mechanisms. In addition, these mechanisms may be used in combination, or with other forms of sensory perceptible notices, such as a visual dialog box on the display.

In the preferred implementation, the external notification mechanism includes an externally mounted LED (light emitting diode) 40. When activated as a result of an event, the LED is illuminated or made to flash. The LED 40 remains activated until the user acknowledges it.

More particularly, the LED 40 is mounted on the external surface of the H/PC 20 in a location that the user can view the light from different angles and sides of the H/PC. In addition, the LED 40 is positioned to be seen when the lid 24 is open or closed. As shown in FIGS. 2A–2C, the H/PC casing 22 has an upper surface 42 on lid 24, a lower surface 44 on base 26, a front side surface 46 (on both lid 24 and base 26), an opposing back side surface 48 (on both lid 24 and base 26), and opposing end surfaces 50 and 52 (on both lid 24 and base 26). The end surfaces 50 and 52 are dimensionally shorter than the elongated side surfaces 46 and 48.

The LED 40 is positioned on the upper surface 42 and wraps around an upper corner to extend onto the end surface 50. The LED is raised on the end surface 50 to be visible from the front. The LED may or may not be raised on the upper surface 42. In this manner, the LED 40 can be viewed when the case 22 is closed, either from above by viewing the LED portion on the upper surface 42 (for instance when the H/PC is sitting on a desk), or from the side by viewing the LED portion on the end surface 50 (for instance when the H/PC is slid upright into a shirt pocket, purse, or briefcase). Additionally, the LED 40 can be viewed when the case 22 is open (FIG. 1) by viewing the raised LED portion on the end surface 50. As an alternative to raising the LED on the end surface, the LED 40 may be configured to wrap around to the inner surface of the lid 24 to be viewable when the case 22 is open. The LED itself might be configured in the illustrated shape, or alternatively a normally shaped LED is configured to emit light into light-transmissive tubing that conforms to the illustrated shape.

As shown in the end view of FIG. 2A, the H/PC 20 also has a deactivation mechanism to deactivate the LED 40 and any other external notification mechanism. In the illustrated implementation, the deactivation mechanism is a deactivation button 54 that is externally mounted on the end 50 to enable a user to quickly locate and deactivate the external notification mechanisms, regardless of whether the lid is open or closed. In a preferred embodiment, the deactivation button 54 and LED 40 are integrated as a single component. The LED 40 can be constructed to project slightly above the face of the deactivation button 54 to act as a bumper to reduce the likelihood of accidental actuation. In other arrangements, the button may be located separately from the LED.

Figure 3:
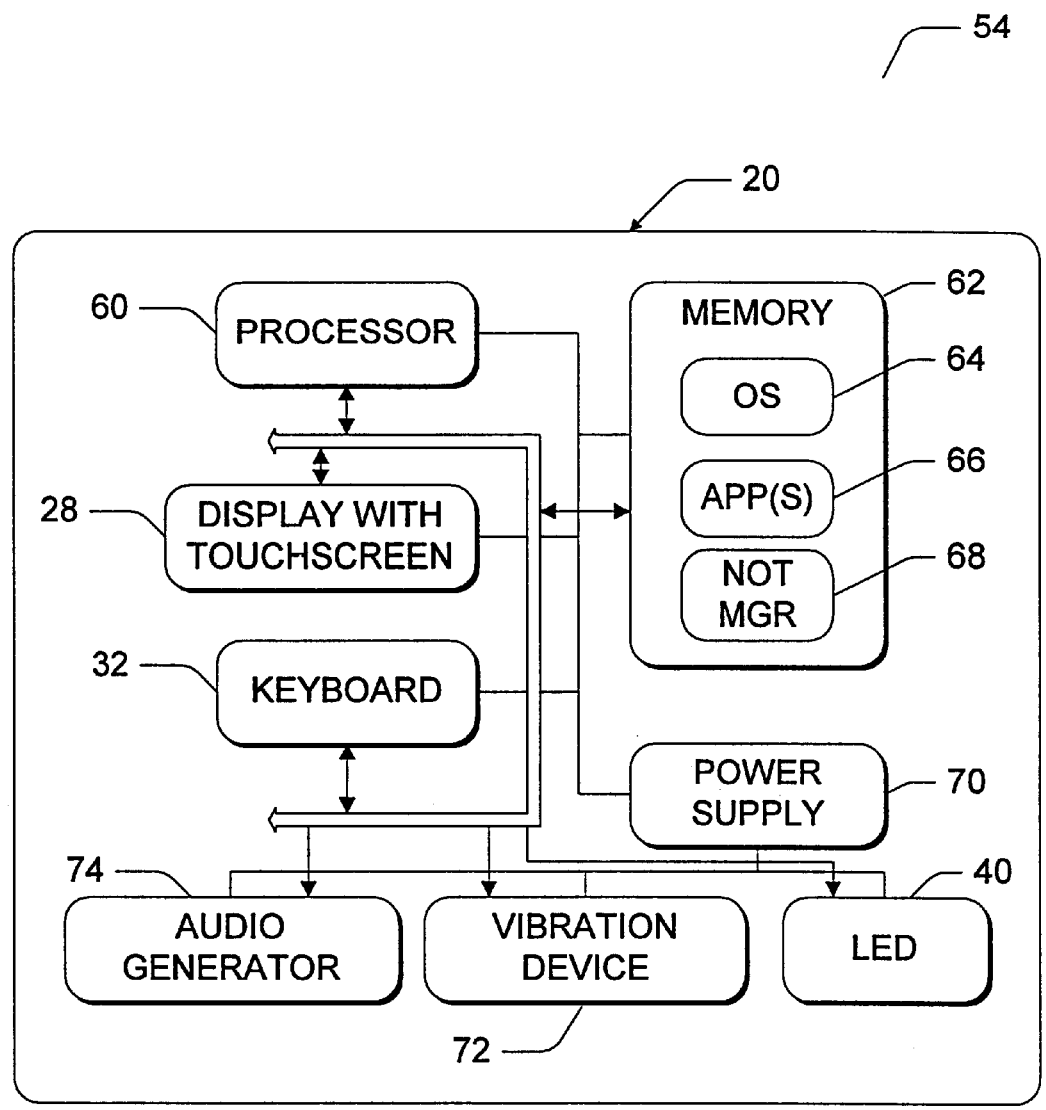
FIG. 3 is a block diagram of the handheld computing device.

FIG. 3 shows functional components of the handheld computing device 20. It has a processor 60, a memory 62, a display 28, and a keyboard 32. The memory 62 generally includes both volatile memory (e.g., RAM) and non-volatile memory (e.g., ROM, PCMCIA cards, etc.). An operating system 64 is resident in the memory 62 and executes on the processor 60. The H/PC 20 preferably runs the Windows® CE operating system from Microsoft Corporation. This operating system is a derivative of Windows® brand operating systems, such as Windows® 95, that is especially designed for handheld computing devices. However, the handheld computing device may be implemented with other operating systems.

One or more application programs 66 are loaded into memory 62 and run on the operating system 64. Examples of applications include email programs, scheduling programs, PIM (personal information management) programs, word processing programs, spreadsheet programs, Internet browser programs, and so forth. The H/PC 20 also has a notification manager 68 loaded in memory 62, which executes on the processor 60. The notification manager 68 handles notification requests from the applications 66, as is described below in more detail with reference to FIG. 4.

The H/PC 20 has a power supply 70, which is implemented as one or more batteries. The power supply 70 might further include an external power source that overrides or recharges the built-in batteries, such as an AC adapter or a powered docking cradle.

The H/PC 20 is also shown with three types of external notification mechanisms: an LED 40, a vibration device 72, and an audio generator 74. These devices are directly coupled to the power supply 70 so that when activated, they remain on for a duration dictated by the notification mechanism even though the H/PC processor and other components might shut down to conserve battery power. The LED 40 preferably remains on indefinitely until the user takes action. The current versions of the vibration device 72 and audio generator 74 use too much power for today's H/PC batteries, and so they are configured to turn off when the rest of the system does or at some finite duration after activation.

Figure 4:
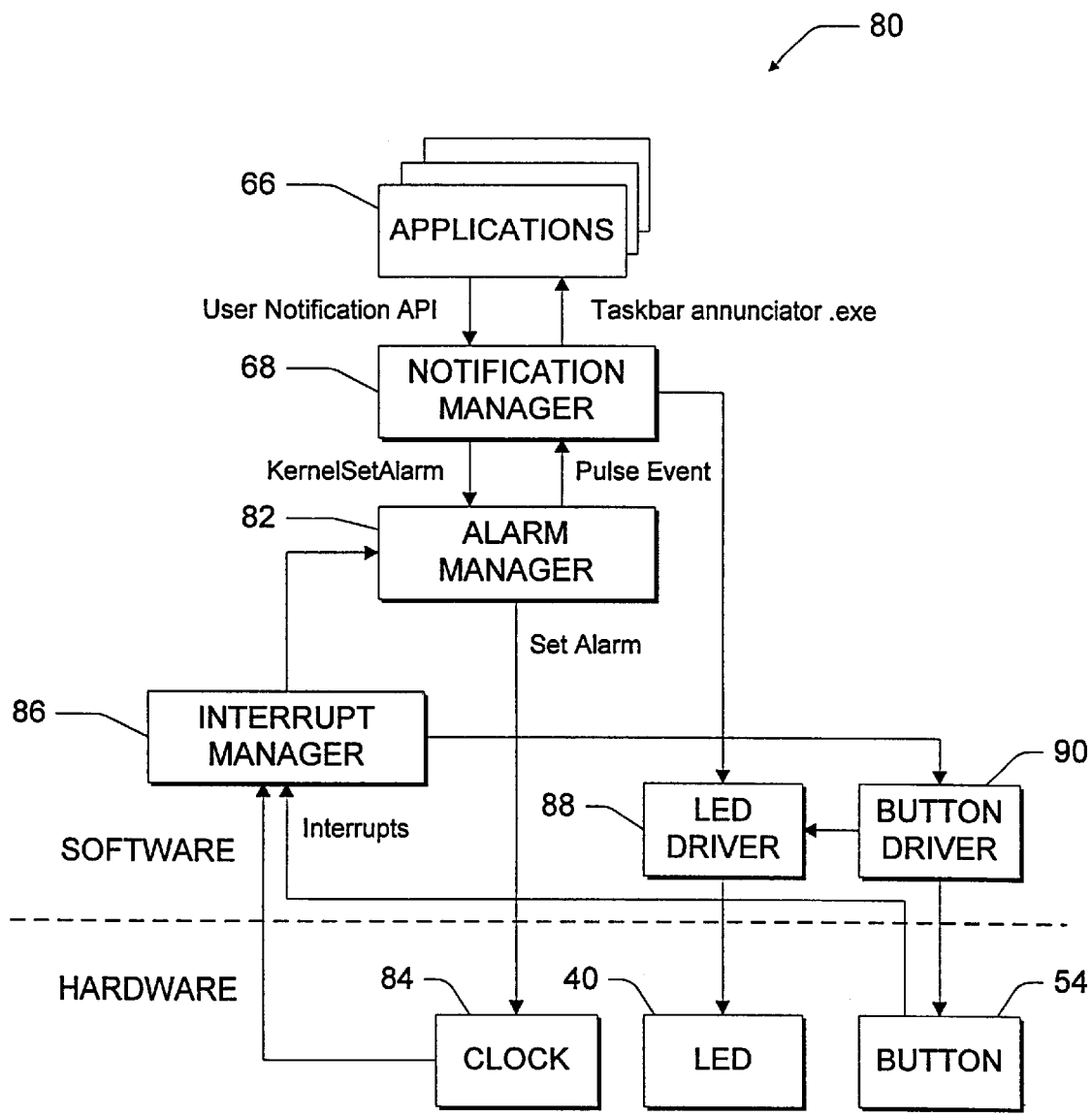
FIG. 4 is a block diagram of the hardware/software architecture of a notification system implemented in the handheld computing device.

FIG. 4 shows the software and hardware architecture of a notification system 80 for the H/PC 20. The notification system 80 has a notification manager 68, which is callable by the applications 66 through a user notification application program interface (API). The API creates a new user notification or modifies an existing one. It is given as:

PegSetUserNotification(hNotification, *AppName, *Time, *UserNotification)

The API has four parameters, three of which are pointers. The "hNotification" parameter specifies whether the call relates to creating a new user notification or to modifying an existing notification. The parameter is either zero, when a new notification is to be added, or contains an identity of the notification to be modified.

The "AppName" pointer points to a null-terminated string that specifies the name of the application 66 that owns the notification. The system uses the application's primary icon as the taskbar annunciator that is set by the notification system to notify the user and enable immediate-click access to the application responsible for the notification. The use of a taskbar annunciator is described below with reference to FIG. 6. The "Time" pointer points to the system time structure that specifies a time when the notification should occur. The "UserNotification" pointer points to a Peg_User_Notification structure that describes the events that are to occur when the notification time is reached.

More particularly, the Peg_User_Notification structure is a user configurable structure that holds notifications options preferred by the user. The application passes the user's preferences to the system when scheduling an event by specifying the address of the structure. Each application passes in a structure that applies only to it, so notifications for different applications can be differentiated. Similarly, an application can pass in different structures for different events, so individual notifications can be differentiated.

Figure 5:
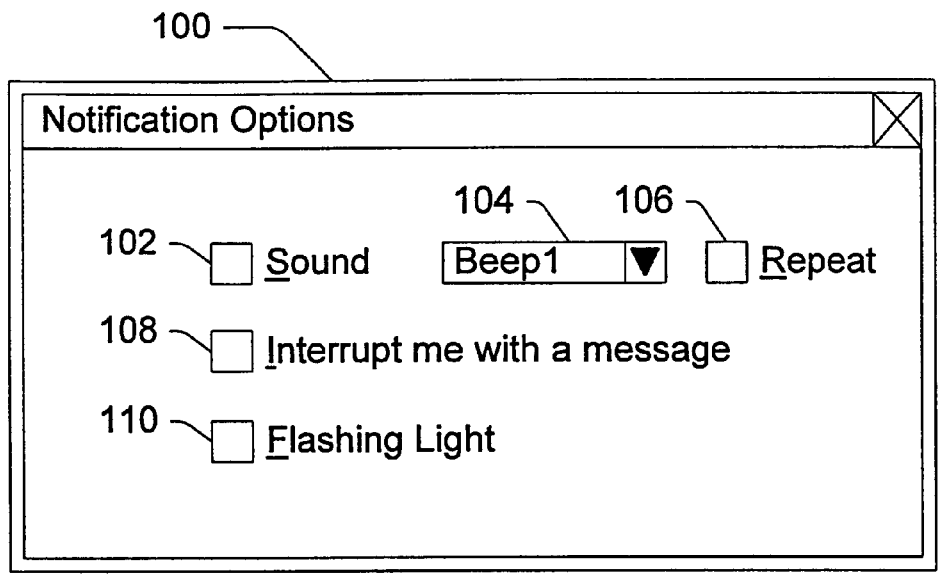
FIG. 5 is a diagrammatic illustration of a graphical user interface window embodied as an "options" dialog box.

The Peg_User_Notification structure contains information used to initialize a dialog box user interface that is presented to the user when setting notification options. FIG. 5 shows an example dialog box 100, which is supported by the notification system 80. In this example, the dialog box 100 includes an option 102 as to whether to sound an alarm and a drop-down menu 104 that lists various available alarm sounds, such as "Beep". The drop-down menu 104 might contain identities of other ".wav" files containing different alarm sounds the user might prefer. A repeat option 106 is also provided so that the user can elect to have the alarm repeated.

The dialog box 100 also has an option 108 that allows a user to enable or disable a dialog box that can be displayed describing the notification when it goes off. An option 110 allows the user to elect whether to have the LED 40 flash, or not, during notification.

It is noted that the dialog box 100 is provided for example purposes, and other options may be included. For instance, the dialog box 100 might include an option to enable/disable the vibration device 72, or to combine the external notification mechanisms so the LED 40, vibration device 72, and alarm 74 all go off at different times in a continuous cycle.

Once the user fills in the dialog box 100, the options are stored in the Peg_User_Notification structure. This structure is provided below:

```
UserNotificationType {
    DWORD ActionFlags;
    TCHAR *DialogTitle;
    TCHAR *DialogText;
    TCHAR *Sound
    DWORD MaxSound;
    DWORD Reserved;
}
```

The "ActionFlags" parameter specifies the actions to take when a notification event occurs. This parameter is a combination of bit flags, as set forth in the following table.

| Value | Meaning |
| --- | --- |
| PUN_LED | Flash LED. |
| PUN_VIBRATE | Vibrate the Device. |
| PUN_DIALOG | Display the user notification dialog box. When this structure is passed to the PegSetUserNotification API, the DialogTitle and DialogText pointers point to the title and text. |
| PUN_SOUND | Play the sound file identified by the Sound pointer. |
| PUN_REPEAT | Repeat sound file for T seconds. |

The "DialogTitle" pointer specifies the title of the user notification dialog box. If this parameter is null, no dialog is displayed. The "DialogText" pointer specifies the text of the user notification dialog box. If this parameter is null, no dialog is displayed. The "Sound" pointer references a buffer that contains the unqualified name of a sound file to play. The "MaxSound" parameter specifies the maximum length of the string that can be copied into the sound buffer. The "Reserved" parameter is reserved for future use and is presently set to zero.

With reference again to FIG. 4, the notification manager 68 passes a command to an alarm manager 82 to set an alarm for a notification event. The alarm manager 82 generates a set alarm command that is output to the real-time clock 84 to tell the clock to set an alarm at the scheduled time of the notification event. When the clock reaches the event time, it notifies an interrupt manager 86 through an interrupt. The interrupt manager 86 informs the notification manager 68 that the time of the event has arrived. The notification manager 68 then sends out activation commands to an LED driver 88 to turn on LED 40. A button device driver 90 is also provided to handle interrupts generated when the notification button 54 is depressed to disable the LED 40.

To explain the architecture in the context of an example situation, suppose the user starts a calendar application 66 and schedules an event notification for 8:00 AM. The user clicks on an "options" button to bring up the dialog box 100 (FIG. 5) to ensure that the LED and alarm are both enabled. The user then closes the dialog box 100 and saves the clock settings. The calendar application 66 calls the notification manager 68 using the PegSetUserNotification API, which includes a pointer to the structure containing information specifying how the LED and alarm are to behave. The notification manager 68 stores the scheduled notification and examines it in light of any other scheduled user notifications to determine which notification is associated with the next chronological event to occur. Suppose that the calendar notification is next to occur. The notification manager 68 then calls the alarm manager 82, which in turn sets a hardware alarm for 8:00 AM in real-time clock 84. The user can then exit the application 66 and turn off the device.

At 8:00 AM, the real-time clock 84 sends an interrupt to interrupt manager 86. The interrupt manager 86 identifies the interrupt as clock-related, and routes the interrupt to the alarm manager 82. Upon receiving the interrupt, the alarm manager 82 pulses the event that the notification manager 68 has been waiting on. The notification manager 68 determines that the event is associated with the 8:00 AM calendar alarm and checks the user options to decide how the user wishes to be notified. Assuming that the user wants the light to flash and an alarm to sound, the notification manager 68 calls the LED device driver 88 to start flashing the LED 40 and concurrently plays the selected alarm. The notification manager 68 also creates a taskbar annunciator.

Suppose that the use is not present at 8:00 AM. The handheld computing device 20 times out and turns off. Due to the direct coupling to power, however, the LED 40 remains flashing. The flash rate is selected to minimize power usage, without compromising usability. As one example, the LED flashes once every two seconds for $\frac{1}{16}$th of a second. The alarm preferably times out with the computing device 20 to conserve power, but it can be configured to repeat until the user acknowledges the notice.

When the user returns, he/she sees the flashing LED 40 and presses the deactivation button 54. Depressing button 54 generates an interrupt that is routed by interrupt manager 86 to keyboard device driver 90. The keyboard driver 90 instructs the LED driver 88 to turn off the LED 40. It is noted that the clock 84 and deactivation button 54 work the same if the H/PC 20 is already on. They still generate interrupts, only the interrupts do not wake up the device.

The deactivation button 54 is preferably implemented to turn off only the external notification mechanisms (i.e., LED and alarm) because these mechanisms can be annoying and consume a significant quantity of power. The taskbar annunciator and optional dialog box remain intact and are not disabled by the deactivation button 54. As a result, the user can open the H/PC and glean more information concerning the notice from the taskbar annunciator and dialog box.

Figure 6:
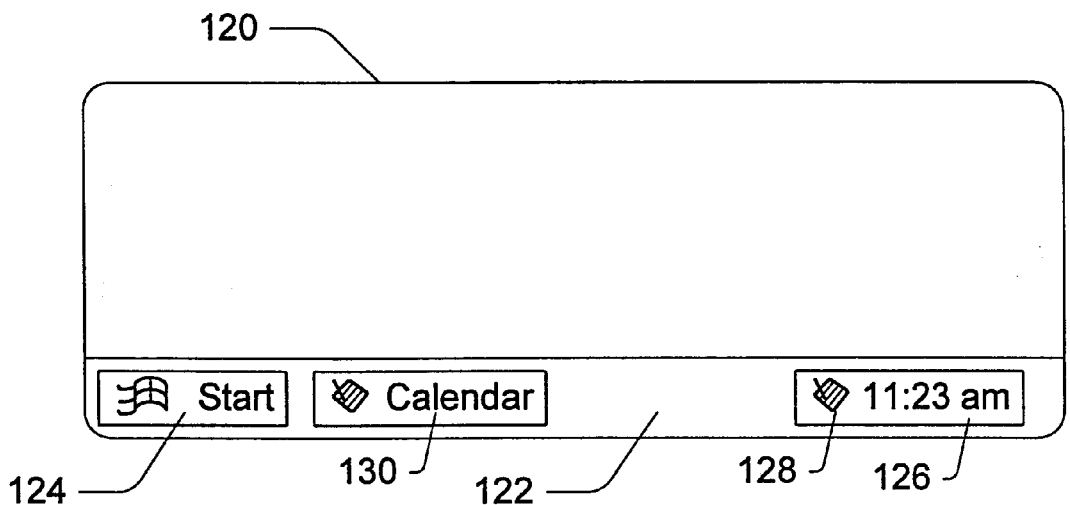
FIG. 6 is a diagrammatic illustration of a screen image presented on a display of the handheld computing device.

When the user opens the H/PC, the notification system 80 optionally causes a taskbar annunciator for the calendar application to be displayed. FIG. 6 shows an example screen image 120 showing the task bar 122 with a "Start" softkey 124 and a time/date area 126. A taskbar annunciator 128 for the calendar application is displayed in the time/date area 126. The annunciator 128 is the icon for the calendar application, thereby immediately informing the user that the source of the notification is the calendar application. The user can then click on the taskbar annunciator 128 using the stylus to start the calendar application, as represented by the calendar softkey 130.

Figure 7:
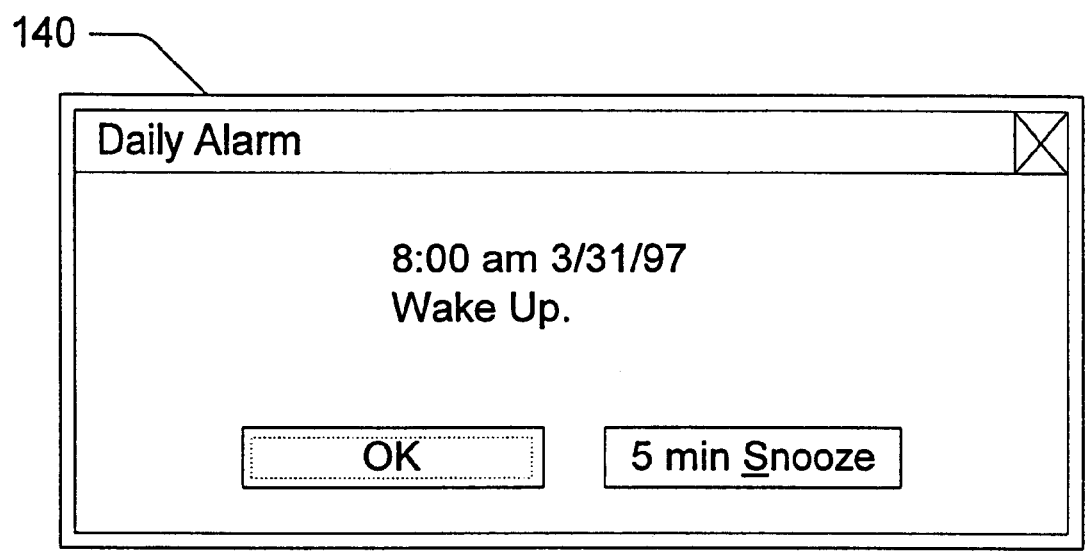
FIG. 7 is a diagrammatic illustration of a graphical user interface window embodied as a "notification" dialog box.

The notification system 80 can optionally display a dialog box that explains the notification to the user; this is faster than starting the originating application, and provides a more noticeable notification if the H/PC is being used when the notification event occurs. FIG. 7 shows an example dialog box 140, which contains a message that informs the user of the 8:00 AM alarm. The user is also presented with the option of accepting the alarm or rescheduling it for an additional five-minute period. It is noted that tapping the taskbar annunciator 128 or a softkey in the dialog box 140 deactivates the LED 40 and alarm, in the same manner as pressing the deactivation button 54. Touching any annunciator or acknowledging any dialog box turns off the external signals, since this tells the notification system that the user is aware of the notifications.

The notification system 80 can handle an arbitrary number of notifications from multiple applications. The notification manager 68 handles the scheduled events in temporal order. In some situations, the flashing LED might represent multiple notifications. Since a single flag bit controls the LED, the user presses the deactivation button 54 once to turn off the LED 40. The user can then open the device and examine the various annunciators to learn which applications are responsible for the notifications.

A full set of user notification APIs is attached to this disclosure as Appendix A.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

APPENDIX A

Notification Reference

The following functions and structures are used with user and application notifications. For further information see the Windows CE Programmer's Reference.
Notification Functions

- PegClearUserNotification
- PegGetUserNotificationPreferences
- PegHandleAppNotifications
- PegRunAppAtEvent
- PegRunAppAtTime
- PegSetUserNotification Notification Structures
- PEG_USER_NOTIFICATION

API REFERENCE

The PegClearUserNotification function deletes a user notification that was created by a previous call to the function PegSetUserNotification.
BOOL PegClearUserNotification(   // notify.h
    HANDLE hNotification   // handle of notification to delete
);
Parameters
hNotification
    Identifies the user notification to delete.
Return Values
If the function succeeds, the return value is TRUE. If the function fails, the return value is FALSE.
See also
Windows CE Notifications, PegSetUserNotification
The PegGetUserNotificationPreferences function queries the user for notification settings by displaying a dialog box showing options that are valid for the current hardware platform.
BOOL PegGetUserNotificationPreference(   // notify.h
    HWND hWndParent,      // handle of parent window
    PPEG_USER_NOTIFICATION IpNotification     // structure with notification settings
);
Parameters
hWndParent
    Identifies the parent window for the notification settings dialog box.
IpNotification
    Points to a PEG_USER_NOTIFICATION structure. When calling the function, this
    structure contains data used to initialize the notification settings dialog box. When the
    function returns, this structure contains the user's notification settings.
Return Values
If the fucntion succeeds, the return value is TRUE. If the function returns TRUE, the returned settings should be saved, and considered when calling PegSetUserNotification.
If the function fails, the return value is FALSE.
See Also
Windows CE Notifications, PegSetUserNotification, PEG_USER_NOTIFICATION
The PegHandleAppNotifications function marks as "handled" all notifications previously registered by the given application. The function turns off the LED and stops vibration (if they were on) only for the given application's events, and removes the taskbar annunciator.
BOOL PegHandleAppNotifications(   // notify.h
    TCHAR *pwszAppName         // name of application whose events are handled
);
Parameters
pwszAppName
    Points to a null-terminated string that specifies the name of the application whose events
    are to be marked as "handled".
Return Values
If the function succeeds, the return value is TRUE. If the function fails, the return value is

APPENDIX A-continued

FALSE.
See Also
Windows CE Notifications, PegGetUserNotification, PegSetUserNotification
The PegRunAppAtEvent function starts running an application when the given event occurs.
Windows CE Notes:
Note NOTIFICATION_EVENT_SYSTEM_BOOT is not supported
BOOL PegRunAppAtEvent(    // notify.h
    TCHAR *pwszAppName,    // name of application to run
    LONG /WhichEvent    // event at which the application is to run
);
Parameters
pwszAppName
   Points to a null-terminated string that specifies the name of the application to be started.
/WhichEvent
   Specifies the event at which the application is to be started. This parameter can be one of the following values.
Value  Meaning

| Value | Meaning |
|---|---|
| NOTIFICATION_EVENT_NONE | No events—remove all event registrations for this application. |
| NOTIFICATION_EVENT_SYNC_END | When data synchronization finishes. |
| NOTIFICATION_EVENT_ON_AC_POWER | When AC Power is connected. |
| NOTIFICATION_EVENT_OFF_AC_POWER | When AC power is disconnected. |
| NOTIFICATION_EVENT_NET_CONNECT | When a network connection is made. |
| NOTIFICATION_EVENT_NET_DISCONNECT | When the network is disconnected. |
| NOTIFICATION_EVENT_DEVICE_CHANGE | When a PCMCIA device is changed. |
| NOTIFICATION_EVENT_IR_DISCOVERED | When an infrared partner is found. |
| NOTIFICATION_EVENT_RS232_DETECTED | When an RS232 connection is made. |
| NOTIFICATION_EVENT_RESTORE_END | When a full device data restore completes. |

Return Values
If the function succeeds, the return value is TRUE. If the function fails, the return value is FALSE.
Remarks
The application is started with a system-defined command line. If there was already an instance of the application running, the new instance must send a private message to the existing instance and then shut down. The command line, which corresponds to the registered event, can be one of the following string constants.

| Constant | Value |
|---|---|
| APP_RUN_AT_BOOT | "AppRunAtBoot" |
| APP_RUN_AFTER_SYNC | "AppRunAfterSync" |
| APP_RUN_AT_AC_POWER_ON | "AppRunAtAcPowerOn" |
| APP_RUN_AT_AC_POWER_OFF | "AppRunAtAcPowerOff" |
| APP_RUN_AT_NET_CONNECT | "AppRunAtNetConnect" |
| APP_RUN_AT_NET_DISCONNECT | "AppRunAtNetDisconnect" |
| APP_RUN_AT_DEVICE_CHANGE | "AppRunDeviceChange" |
| APP_RUN_AT_IR_DISCOVERY | "AppRunAtIrDiscovery" |
| APP_RUN_AT_RS232_DETECT | "AppRunAtRs232Detect" |
| APP_RUN_AFTER_RESTORE | "AppRunAfterRestore" |

Remarks
In some cases, the preceding strings are merely the prefix of the command line, and the rest of the command line is used as a parameter.
You should use this function sparingly, because automatically starting an application can confuse the user and cause low-memory conditions on a machine with restricted memory. Ideally, the application should be small and non-intrusive.
See Also
Window CE Notifications, PegRunAppAtTime, PegEventHasOccurred
The PegRunAppAtTime function requests the system to start running the given application at the given time.
BOOL PegRunAppAtTime(    // notify.h
    TCHAR *pwszAppName,    // name of application to run
    SYSTEMTIME *IpTime    // time when to run the application
);
Parameters
pwszAppName
   Points to a null-terminated string that specifies the name of the application to be run.
IpTime
   Points to a SYSTEMTIME structure that specifies the time when the given application is to be run. If this parameter is NULL, the existing run request is deleted and no new request is entered.
Return Values
If the function succeeds, the return value is TRUE. If the function fails. the value is FALSE.
Remarks
Calling this function replaces any previous run request.
The system passes the APP_RUN_AT_TIME string to the application as the command line.
If an instance of the application is already running, the new instance must send a private message to the existing instance and then shut down.
You should use this function sparingly, because automatically starting an application can confuse the user and cause low-memory conditions on a machine with restricted memory.

APPENDIX A-continued

Ideally, the application should be small and non-intrusive.
See Also
Windows CE Notifications, PegRunAppAtEvent
The PegSetUserNotification function creates a new user notification or modifies an existing
one.
HANDLE PegSetUserNotification(      // notify.h
    HANDLE hNotification,   // handle of the notification to overwrite, or zero
    TCHAR *pwszAppName,     // name of application that owns this notification
    SYSTEMTIME *IpTime, // time when the notification is to occur
    PPEG_USER_NOTIFICATION IpUserNotification       // contains notification
parameters
);
Parameters
hNotification
    Identifies the notification to overwrite, or zero to add a new notification.
pwszAppName
    Points to a null-terminated string that specifies the name of the application that owns this
    notification. The system uses the application's primary icon as the taskbar annunciator
    for the notification. The user can start the application by selecting the annunciator.
IpTime
    Points to the SYSTEMTIME structure that specifies the time when the notification should
    occur.
IpUserNotification
    Points to the PEG_USER_NOTIFICATION structure that describes the events that are to
    occur when the notification time is reached.
Return Values
If the function succeeds, the return value is the handle of the notification. An application can
use the handle to overwrite or delete the notification. The return value is zero if the
notification could not be set.
Remarks
The notification occurs at the specified time, without starting the application. The application
can specify the notification options, including whether to light the LED, generate a sound, or
display a dialog box. However, an application typically uses the
PegGetUserNotificationPreferences function to allow the user to set the notification
options.
The user can start the owning application when the notification occurs. In this case, the
system starts a new instance of the application using the
APP_RUN_TO_HANDLE_NOTIFICATION string as the prefix of the command line, and the
notification handle (converted to a string) as the postfix. If another instance of hte application
is already running, the new instance must pass a private message to the old instance and
then shut down.
See Also
Windows CE Notifications, PegHandleAppNotifications
The PEG_USER_NOTIFICATION structure contains information used to initialize the user
notifications settings dialog box, and receives the user's notification preferences entered by
way of the dialog box. Also used when setting a user notification.
typedef struct UserNotificationType {
    DWORD ActionFlags;
    TCHAR *pwszDialogTitle;
    TCHAR *pwszDialogText;
    TCHAR *pwszSound;
    DWORD nMaxSound;
    DWORD dwReserved;
} PEG_USER_NOTIFICATION, *PPEG_USER_NOTIFICATION;
Members
ActionFlags
    Specifies the action to take when a notification event occurs. This parameter can be a
    combination of the following flags.
Value Meaning
PUN_LED      Flash the LED.
PUN_VIBRATE      Vibrate the device.
PUN_DIALOG   Display the user notification dialog box. When this structure is passed to the
PegSetUserNotification function, the pwszDialogTitle and pwszDialogText members must
provide the title and text of the dialog box.
PUN_SOUND   Play the sound specified by the pwszSound member. When passed to PSVN,
the pwszSound member must provide the name of the sound file.
PUN_REPEAT Repeat the pwszSound for 10–15 seconds. Only valid if PUN_SOUND is set.
    Any flag that is not valid on the current hardware platform is ignored.
pwszDialogTitle
    Specifies the title of the user notification dialog box. If this parameter is NULL, no dialog
    is displayed. The PegGetUserNotificationPreferences function ignores this members.
pwszDialogText
    Specifies the text of the user notification dialog box. If this parameter is NULL, no dialog
    is displayed. The PegGetUserNotificationPreferences function ignores this member.
pwszSound
    Points to a buffer that contains the unqualified name of a sound file to play. (The file is
    assumed to reside in the system media directory.) This parameter is ignored if the
ActionFlags member does include the PUN_SOUND flag.
nMaxSound

APPENDIX A-continued

Specifies the maximum length of the string that the
PegGetUserNotificationPreferences function can copy into the pwszSound buffer.
Because the string may be a path name in a future release, the buffer must be at least
the length derived by the following expression: PATH_MAX * sizeof(TCHAR). This
member is ignored by the PegSetUserNotification function.
dwReserved
Reserved; must be zero.
Remarks
This structure is passed in the PegGetUserNotificationPreferences function. Initial settings
are used to populate the dialog. If the function returns TRUE, the returned settings should be
saved, and considered when calling PegSetUserNotification. Settings for hardware not on
the current device will be ignored.
It is also used when calling PegSetUserNotification, to describe what should happen when
the notification time is reached.
See Also
Windows CE Notifications, PegGetUserNotificationPreferences,
PegSetUserNotification

What is claimed is:

1. In a portable handheld computing device having an operating system that provides a graphical user interface environment capable of presenting at least one graphical window on a display and an external notification mechanism, a notification program executing on the operating system, comprising:

a graphical user interface which enables a user to set notification options;

a notification manager to manage one or more events, the notification manager generating a command to set a time when an event is scheduled;

an alarm manager to receive the set time command from the notification manager and to generate a set alarm command which informs a clock to set an alarm at the time of the event; and an interrupt manager to receive an interrupt from the clock when the time of the event arrives and the pass interrupt to the notification manager so that the notification manager can activate the external notification mechanism.

2. A portable handheld computing device comprising:

a processor;

a display;

an operating system executing on the processor to provide a graphical user interface environment capable of presenting at least one graphical window on the display;

at least one application running on the operating system; and a notification system that is callable by the application to alert a user of an event, the notification system having a sensory perceptible notification mechanism that is activated as a result of the event to notify the user.

3. A portable handheld computing device as recited in claim 2 wherein the notification mechanism comprises a light.

4. A portable handheld computing device as recited in claim 2 wherein the notification mechanism comprises a dialog box presented on the display.

5. A portable handheld computing device as recited in claim 2 wherein the notification mechanism comprises an audio generator.

6. A portable handheld computing device as recited in claim 2 wherein the notification mechanism comprises a vibration device.

7. A portable handheld computing device as recited in claim 2 wherein the notification system also has a deactivation mechanism to deactivate the notification mechanism.

8. A portable handheld computing device as recited in claim 2 wherein the notification mechanism comprises a light emitting diode (LED) and the notification system further comprises a button integrated with the LED to deactivate the LED.

9. A portable handheld computing device as recited in claim 2 wherein the notification system supports a graphical user interface which enables a user to set notification options specifying how the notification mechanism is to operate.

10. A portable handheld computing device as recited in claim 2 wherein:

the graphical user interface provided by the operating system has a taskbar and the event relates to the application: and the notification system places a taskbar annunciator in the taskbar, which upon actuation, starts the application responsible for the event.

* * * * *